United States Patent [19]
Ozeki

[11] Patent Number: 5,223,870
[45] Date of Patent: Jun. 29, 1993

[54] OVERHEAD PROJECTOR WITH IMAGE DIRECTION ADJUSTING DEVICE

[75] Inventor: Jiro Ozeki, Tokyo, Japan
[73] Assignee: Slidex Corporation, Tokyo, Japan
[21] Appl. No.: 949,604
[22] Filed: Sep. 23, 1992
[30] Foreign Application Priority Data
  Apr. 2, 1992 [JP] Japan .................................. 4-080835
[51] Int. Cl.⁵ ............................................. G03B 21/18
[52] U.S. Cl. .................................. 353/95; 353/27 R; 353/23; 353/DIG. 3
[58] Field of Search ................. 353/120, 122, DIG. 3, 353/DIG. 5, DIG. 6, 119, 95, 96, 27 R, 26 R, 22, 23, 24, 108

[56] References Cited
U.S. PATENT DOCUMENTS

| | | | |
|---|---|---|---|
| 3,807,850 | 4/1974 | Ozeki | 353/DIG. 6 |
| 4,133,605 | 1/1979 | Wiggin | 353/DIG. 3 |
| 4,184,754 | 1/1980 | Ozeki | 353/95 |
| 4,989,330 | 2/1991 | Ozeki | 353/120 |
| 5,013,148 | 5/1991 | Ozeki | 353/DIG. 3 |

Primary Examiner—William A. Cuchlinski, Jr.
Assistant Examiner—William C. Dowling
Attorney, Agent, or Firm—Richard A. Speer

[57] ABSTRACT

The overhead projector include a lower plate disposed on a housing of a main body of the overhead projector. The lower plate can rotate about a light axis of a condenser lens and has a transparent portion facing at least the condenser lens. A projection lens is supported above the condenser lens and an upper plate is disposed under the projection lens. The upper plate is supported vertically resiliently with respect to the projection lens and has a transparent portion at least facing the condenser lens. The upper plate is able to rotate about a light axis of the condenser lens. When images projected on a screen lie sideways or upside down, the upper and lower plates which are interposing a film therebetween are rotated. Thus, the directions of the projected images are correctly adjusted.

20 Claims, 7 Drawing Sheets

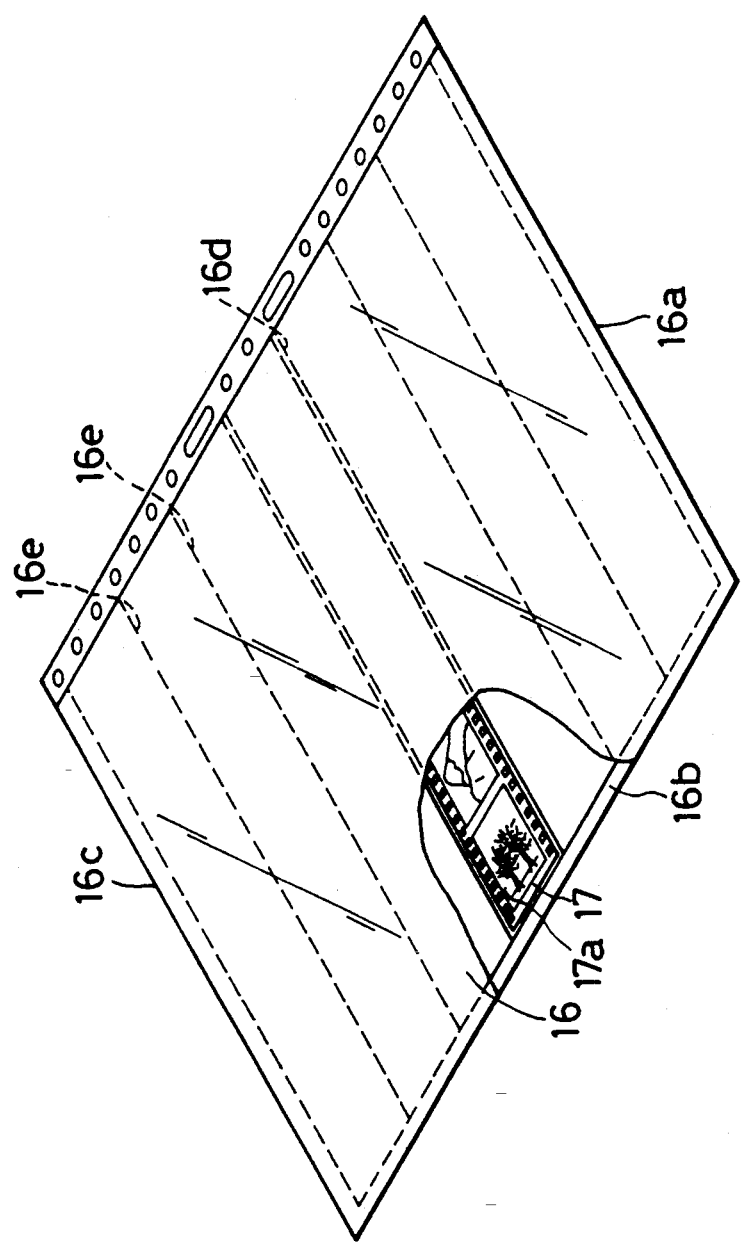

OVERHEAD PROJECTOR WITH IMAGE DIRECTION ADJUSTING DEVICE

BACKGROUND OF THE INVENTION

The invention relates to an overhead projector, and in particular, to an overhead projector having an image rotating device for rotating projected images.

RELATED ART STATEMENT

It has already been suggested to insert a plurality of long positive films, which include a plurality of frames in a line each of which has images recorded therein, into a transparent jacket side by side, and then project the images recorded in the films for each frames through an overhead projector with the films being enclosed in the transparent sheet. For instance, Japanese Patent Publication No. 2-19798 published in Japan on May 7, 1990, which was previously laid open on Nov. 16, 1985 as Kokai 60-230898, included such a suggestion. The jacket disclosed in the Patent Publication comprises two transparent resin sheets with one overlapped on the other. The two sheets are secured to each other at three edges with the other edge being free from secured. Between the two sheets several pockets are formed into each of which a long film is to be inserted through a free edge. Since the jacket is made of transparent materials, it is possible to put the jacket on a platen to project images recorded in each frames with the films being enclosed in the jacket.

The images are frequently recorded in each frames of the film in different directions. For this reason, the images may be projected on a screen sideways or upside down, if each of the frames of the film are not precisely directed on a platen of an overhead projector. Japanese Laid Open (Kokai) No. 56-47030 suggested an overhead projector to solve the above mentioned problem. The overhead projector disclosed in Japanese Kokai No. 56-47030 maintains the position of a reflector for reflecting light flux forwarding from a projection lens toward a screen and has a rotatable main body on which a film jacket is put. However, this overhead projector has a large rotatable part and therefore needs a large space for rotation of the rotatable part.

SUMMARY OF THE INVENTION

It is an object of the present invention to solve the aforementioned problem that the conventional overhead projector has a large rotatable portion and therefore needs a large space for rotation of the rotatable part.

The invention provides an overhead projector having a lower plate disposed on an upper surface of a housing so that the lower plate is capable of rotating about a light axis of an condenser lens supported in the housing of a main body of the overhead projector. This lower plate has a transparent portion facing at least the condenser lens. Over the condenser lens is supported a projection lens and an upper plate is disposed under the projection lens. The upper plate is resiliently and vertically supported with respect to the projection lens and has a transparent portion facing at least the condenser lens. In addition, the upper plate is capable of rotating about a light axis of the condenser lens. An object is resiliently interposed between the lower plate and the upper plate to be rotated together with the lower and upper plates.

In a preferred embodiment, the lower plate has a circular periphery and is disposed in a circular opening formed in the upper surface of the housing to be supported rotatably by a camera cone of the condenser lens.

In a preferred embodiment, the overhead projector has a support system for supporting the upper plate. The supporting system comprises a rotatable member rotatably formed with a camera cone of the projection lens, a plurality of first pillars extending downwardly from the rotatable member, second pillars to which the first pillars are slidable vertically, and device disposed between the camera cone of the projection lens and the second pillars for biasing the second pillars downwardly. The upper plate is supported at the second pillars.

In another preferred embodiment, a nonslip surface is formed around the upper and lower plates. A sheet having an opening facing the condenser lens is preferably put on an upper surface of the lower plate in order to prevent a film jacket from rubbing during rotation thereof.

In still another preferred embodiment, the support arm has a rounded surface at its bottom at which the support arm is secured to the housing for guiding an edge of the jacket enclosing the object therein when the lower and upper plates are rotated with the jacket being interposed therebetween. This rounded surface faces the condenser lens.

The mode of operation of the aforementioned overhead projector will be described hereinbelow. At first the upper plate is lifted up and then the jacket enclosing the film therein is put on the lower plate so that a desired frame of the film is positioned just above the condenser lens. Next, power source is switched to be on to project images recorded in the frame on a screen. If the images on the screen lie sideways or upside down, the upper plate is rotated by handling the upper plate or a support for the upper plate by hand. Since the jacket enclosing the film is resiliently interposed between the lower and upper plates, the jacket and the lower plate rotate as the upper plate rotates. Thus, the directions of the images projected on a screen can be adjusted to their correct directions.

The above and other objects and advantageous features of the present invention will be made apparent form the following description made with reference to the accompanying drawings.

BRIEF DESCRIPTION OF THE DRAWINGS

FIG. 4 is a perspective view of a jacket for enclosing positive film therein, which jacket is an example of an object for use of the overhead projector.

FIG. 5 is a perspective view illustrating how to use the overhead projector wherein

DESCRIPTION OF THE PREFERRED EMBODIMENT

Figure 1:
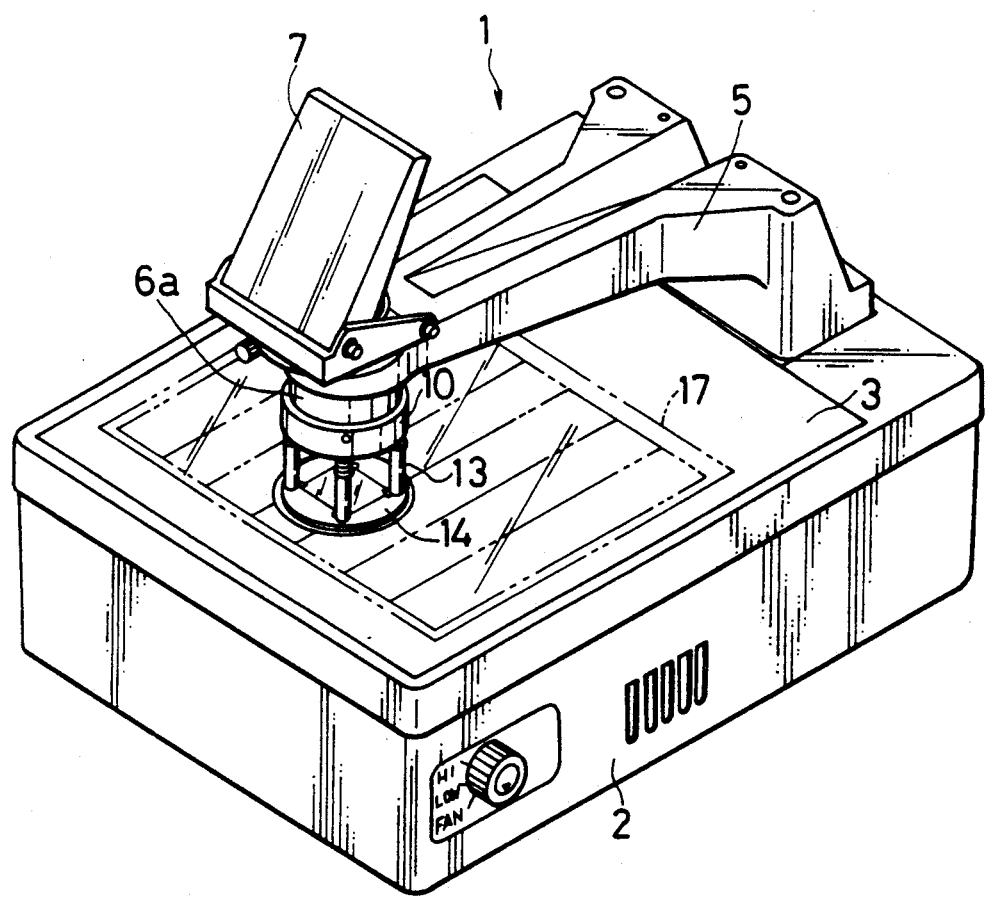
FIG. 1 is a perspective view illustrating an overhead projector in accordance with an embodiment of the present invention.
Figure 2:
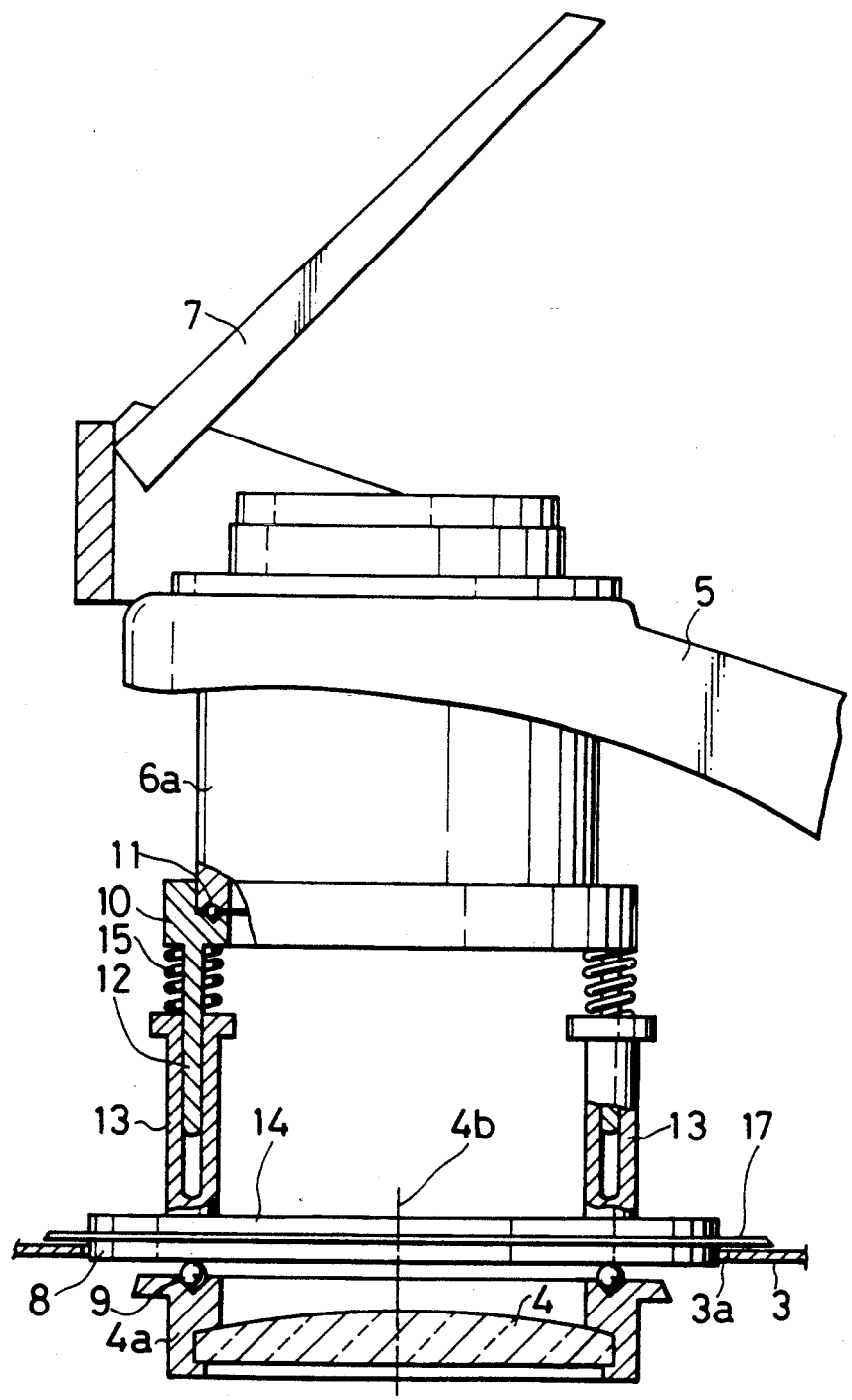
FIG. 2 is a side view of the overhead projector shown in FIG. 1 with a partial, vertical cross-sectional view of the overhead projector.
Figure 3:
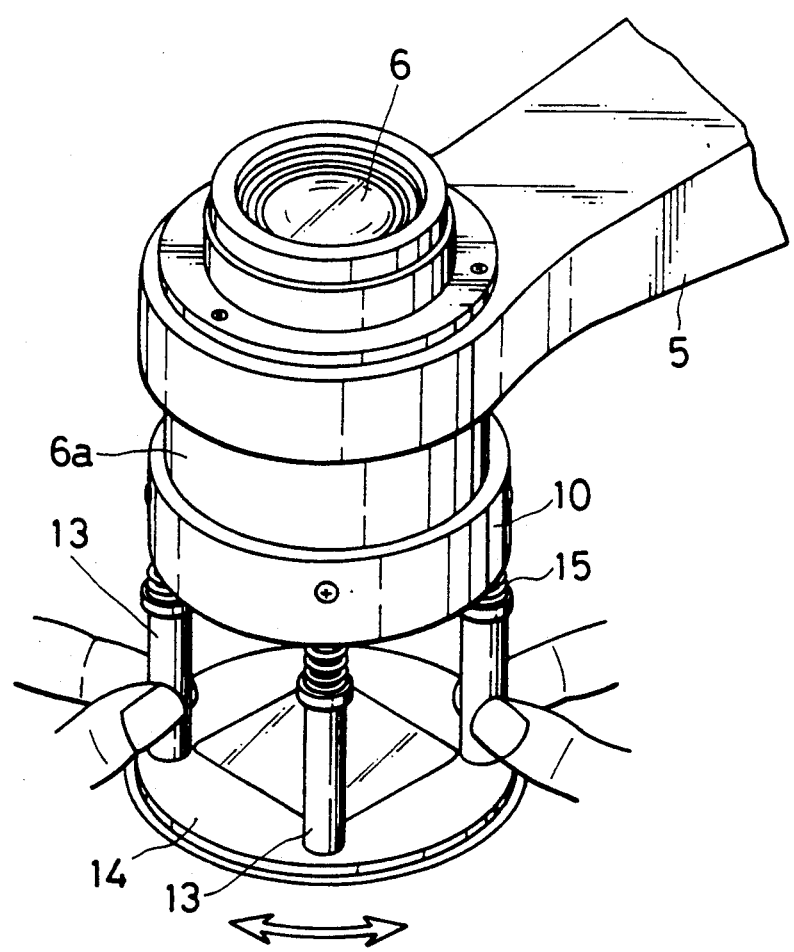
FIG. 3 is a perspective view illustrating a projection lens assembled in the overhead projector shown in FIG. 1.

FIGS. 1 to 3 illustrates an embodiment in accordance with the present invention. An overhead projector 1 has a box type housing 2 on an upper surface of which is formed a flat platen 3. The platen 3 has a circular opening 3a formed therein under which a camera cone 4a of a condenser lens 4 is disposed. The camera cone 4a is supported at the housing 2. As illustrated in FIG. 1, a support arm 5 is secured to the housing 2 at one edge thereof. The support arm 5 extends transversely over the condenser lens 4 and supports a camera cone 6a supporting a projection lens 6 at its one end. The condenser lens 4 and the projection lens 6 have a common light axis. A reflecting mirror 7 is supported at an end of the support arm 5 so that the mirror 7 is disposed over the projection lens 6. Light flux forwarding through the projection lens 6 is reflected transversely by the reflecting mirror 7. The mirror 7 is omitted in FIG. 3 for clearly showing the projection lens 6.

As illustrated in FIG. 2, a circular lower plate 8 made of transparent glass is disposed in an opening 3a formed in the platen 3. The lower plate 8 is supported on an upper surface of the camera cone 4a by means of a ball bearing 9 so that the lower plate 8 is capable of rotating about a light axis 4b of the condenser lens 4. Though the lower plate 8 is wholly made of transparent glass in the present embodiment, it should be noted that only a portion of the lower plate 8 corresponding to the condenser lens 4 may be made of transparent glass and the other portions may be made of opaque material. The transparent portion of the lower plate 8 may be made of a suitable material other than glass, for instance, transparent resin.

At a lower end of the camera cone 6a of the projection lens 6 is supported a ring member 10 through a ball bearing 11 so that the ring member 10 is capable of rotating about the light axis 4b of the condenser lens 4. The ring member 10 is formed at its lower surface with four support pillars 12 extending downwardly which are slidably inserted hollow pillars 13. The hollow pillars 13 are disposed on an upper plate 14 which is positioned in alignment with the lower plate 8. The upper plate 14 is made of transparent glass. Similar to the lower plate 8, only a portion of the upper plate 14 corresponding to the condenser glass 4 is made of transparent material. A suitable material for the upper plate 14 includes resin material in addition to glass. Between the ring member 10 and the hollow pillars 13 are positioned springs 15 surrounding the support pillars 12 for biasing the upper plate 14 toward the lower plate 8.

FIG. 4 illustrates an example of a film jacket for use of the overhead projector 1. The jacket 16 comprises two transparent sheets made of resin with one of them being overlapped on the other. The two transparent sheets are secured to each other at their three edges 16a, 16b, 16c with an edge 16d being unsecured to be free. The jacket 16 has a plurality of pockets 16e having an open end at the edge 16d. Long films 17 having a plurality of frames 17a therein is inserted into the pockets 16e through the open end 16d.

Figure 5A:
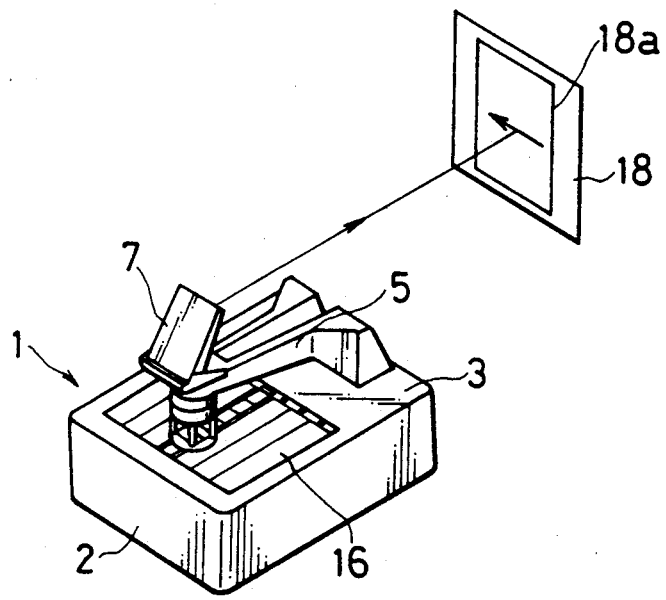
FIG. 5(a) shows a case in which projected images turn sideways and FIG. 5(b) shows a case in which projected images are in a correct direction.
Figure 5B:
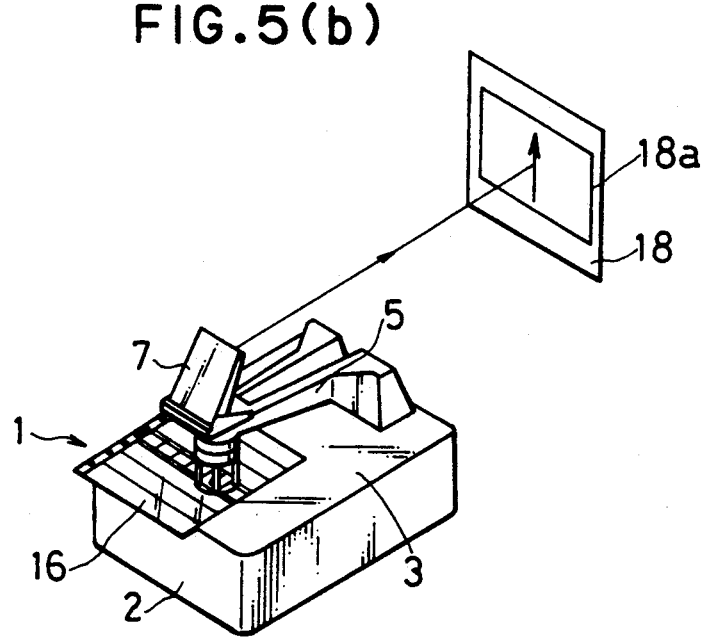

FIG. 5 illustrates an operation of the overhead projector 1 wherein the jacket 16 is interposed between the lower plate 8 and the upper plate 14 and a desired frame 17a of the film 17 is arranged to be disposed over the condenser lens 4. Then, a light source is turned on to project images recorded on the frame 17a on a screen 18. If projected images 18a turn sideways as shown in FIG. 5(a) or projected images 18a lie upside down, the hollow pillars 13 are grasped to rotate the upper plate 14 as shown in FIG. 3. This operation rotates the upper plate 14 about the light axis 4b of the condenser lens 4 with the film jacket 16 being interposed between the upper plate 14 and the lower plate 8. The film jacket 16 and the lower plate 8 also rotates together with the upper plate 14. The projected images 18a are thus correctly directed as shown in FIG. 5(b).

Figure 6:
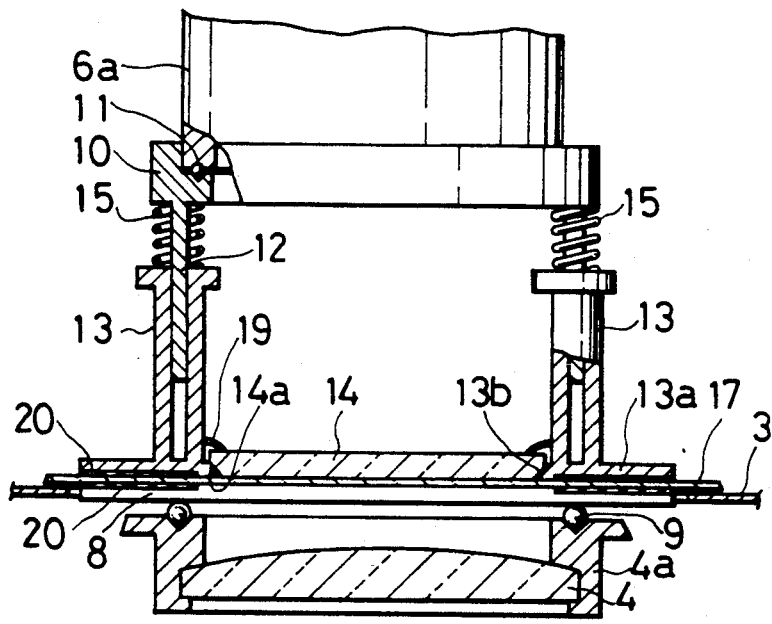
FIG. 6 is a vertical cross-sectional view of another embodiment illustrating an interposed film jacket.
Figure 7:
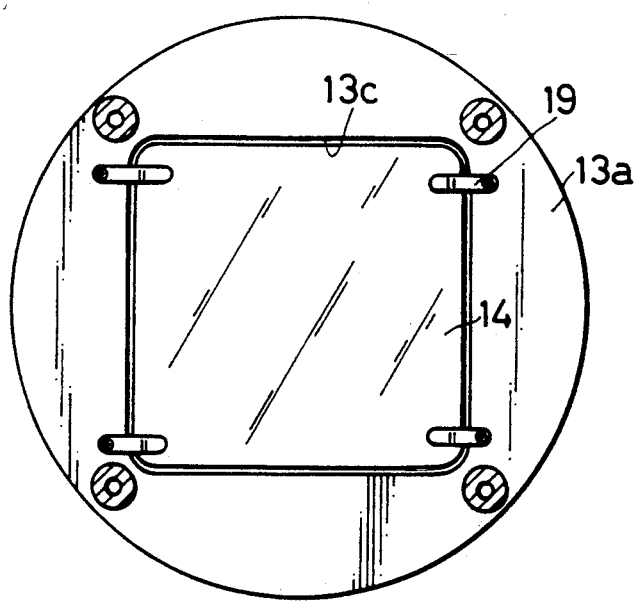
FIG. 7 is a horizontal cross-sectional view of FIG. 6.

Another embodiment is shown in FIGS. 6 and 7. In this embodiment, the hollow pillars 13, which are slidably engaged to the support pillars 12, are integrally formed at its lower end with a ring member 13a. The ring member 13a has a square opening 13c formed therein as shown in FIG. 7 and has an inclination 13b along the periphery of the square opening 13a. The upper plate 14 made of transparent glass is disposed in the opening 13c defined by the inclination 13b. The upper plate 14 is formed at its lower surface with an inclination 14a along the periphery of the lower surface. The upper plate 14 is disposed in the opening 13c so that the inclination 14a of the upper plate 14 is put on the inclination 13b of the ring member 13a. The ring member 13a has four spring-sets 19 which hold the upper plate 14 on the inclination 13b of the ring member 13a. A nonslip coating 20 such as a rubber layer is disposed between a lower surface of the ring member 13a and an upper surface of the lower plate 14 around the opening 13c. The nonslip coating 20 prevents the film jacket 16 from slipping on the lower plate 14.

Figure 8:
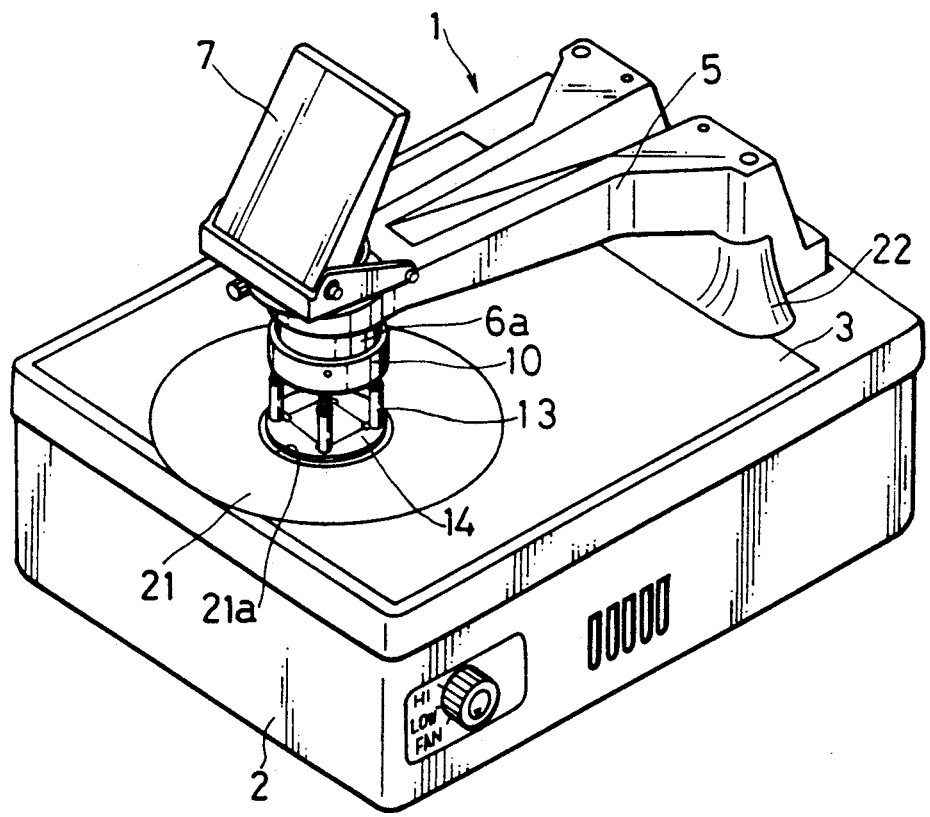
FIG. 8 is a perspective view illustrating an overhead projector in accordance with another embodiment of the present invention.
Figure 9:
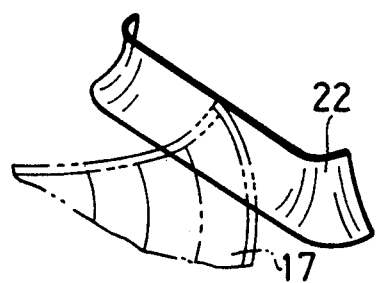
FIG. 9 is a partial perspective view illustrating a rounded surface for guiding a film edge formed at the bottom of the support arm.

Still another embodiment is shown in FIGS. 8 and 9. In this embodiment, a circular sheet 21 is disposed on the platen 3 surrounding the upper plate 14. The sheet 21 has a circular opening 21a formed therein in which the upper plate 14 is disposed. Since the sheet 21 is capable of rotating together with the film jacket 16, the jacket 16 is prevented from being rubbed due to friction generated between the jacket 16 and the platen 3. At the bottom of the support arm 5 at which the support arm 5 is secured to the housing 2 is formed with a guide member 22 having a convex, rounded surface for guiding the jacket 16. As shown in FIG. 9, the guide member 22 smoothly guides an edge of the jacket 16 when the jacket 16 is rotated in order to prevent the edge of the jacket 16 from damaging by contacting a non-rounded corner of the support arm 5.

As aforementioned with reference to the preferred embodiments, the present invention has many advantages. The overhead projector in accordance with the present invention has the upper and lower plates which interpose an object rotatably about a light axis of the condenser lens, so that the overhead projector is capable of correcting the positions of the projected images even if the images would be projected sideways or upside down. The embodiment having a nonslip coating around the lower and upper plates is capable of supporting the object without slip of the object. The embodiment wherein the ratable member is secured rotatably to the camera cone of the projection lens and has downwards extending support pillars at the lower end of which is vertically and resiliently disposed the upper plate, is capable of correcting the direction of the projected images easily by rotating the rotatable member. The embodiment wherein the sheet is disposed on the lower plate so that the sheet is capable of rotating together with the lower plate prevents the jacket from rubbing due to friction generated between the jacket and the upper surface of the housing. The embodiment having a convex, rounded surface at the bottom of the support arm prevents the edge of the jacket from damaging due to contact with a non-rounded corner of the support arm.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. An overhead projector comprising:
   a main body including a housing, a light source housed in the housing, and a condenser lens for directing light emitted from the light source upwardly;
   a support arm disposed at one edge of the main body to extend over the condenser lens;
   a projection lens supported by the support arm to be disposed over the condenser lens;
   reflecting means disposed over the projection lens for reflecting light forwarding through the projection lens to a horizontal direction;
   a lower plate disposed on an upper surface of the housing for rotation about a light axis of the condenser lens, said lower plate having a transparent portion facing at least the condenser lens;
   an upper plate disposed under the projection lens and resiliently support for vertical movement with respect to the projection lens, said upper plate having a transparent portion facing at least the condenser lens and being capable of rotating about the light axis of the condenser lens;
   said lower plate cooperating with said upper plate to resiliently interpose an object therebetween to rotate the object therewith.

2. The overhead projector in accordance with claim 1 wherein said lower plate has a circular periphery and is disposed in a circular opening formed in the upper surface of the housing to be supported rotatably by a camera cone of the condenser lens.

3. The overhead projector in accordance with claim 1 further comprising a rotatable member rotatably formed with a camera cone of the projection lens, a plurality of first pillars extending downwardly from the rotatable member, second pillars to which said first pillars are vertically slidably engaged, and means disposed between the camera cone of the projection lens and the second pillars for biasing the second pillars downwardly, and wherein said upper plate is arranged below the second pillars.

4. The overhead projector in accordance with claim 2 further comprising a rotatable member rotatably formed with a camera cone of the projection lens, a plurality of first pillars extending downwardly from the rotatable member, second pillars to which said first pillars are vertically slidably engaged, and means disposed between the camera cone of the projection lens and the second pillars for compressing the second pillars downwardly, and wherein said upper plate is arranged below the second pillars.

5. The overhead projector in accordance with claim 1 wherein a nonslip surface is formed around the upper and lower plates.

6. The overhead projector in accordance with claim 2 wherein a nonslip surface is formed around the upper and lower plates.

7. The overhead projector in accordance with claim 3 wherein a nonslip surface is formed around the upper and lower plates.

8. The overhead projector in accordance with claim 5 wherein said upper plate is formed at its central portion with an opening having an inclination at its edge, said overhead projector further including a transparent glass plate disposed in said opening, said glass plate having at its edge an inclination adapted to be engaged to said inclination of the opening, and means for biasing the transparent glass plate downwardly.

9. The overhead projector in accordance with claim 6 wherein said upper plate is formed at its central portion with an opening having an inclination at its edge, said overhead projector further including a transparent glass plate disposed in said opening, said glass plate having at its edge an inclination adapted to be engaged to said inclination of the opening, and means for biasing the transparent glass plate downwardly.

10. The overhead projector in accordance with claim 7 wherein said upper plate is formed at its central portion with an opening having an inclination at its edge, said overhead projector further including a transparent glass plate disposed in said opening, said glass plate having at its edge an inclination adapted to be engaged to said inclination of the opening, and means for biasing the transparent glass plate downwardly.

11. The overhead projector in accordance with claim 1 wherein on the lower plate is put a sheet having an opening corresponding to the condenser lens.

12. The overhead projector in accordance with claim 2 wherein on the lower plate is put a sheet having an opening corresponding to the condenser lens.

13. The overhead projector in accordance with claim 3 wherein on the lower plate is put a sheet having an opening corresponding to the condenser lens.

14. The overhead projector in accordance with claim 4 wherein on the lower plate is put a sheet having an opening corresponding to the condenser lens.

15. The overhead projector in accordance with claim 5 wherein on the lower plate is put a sheet having an opening corresponding to the condenser lens.

16. The overhead projector in accordance with claim 6 wherein on the lower plate is put a sheet having an opening corresponding to the condenser lens.

17. The overhead projector in accordance with claim 1 wherein said support arm has a rounded surface at its bottom at which the support arm is secured to the housing for guiding an edge of a jacket supporting said object when the lower and upper plates are rotated with said sheet being interposed therebetween, said rounded surface facing the condenser lens.

18. The overhead projector in accordance with claim 2 wherein said support arm has a rounded surface at its bottom at which the support arm is secured to the housing for guiding an edge of a jacket supporting said object when the lower and upper plates are rotated with said sheet being interposed therebetween, said rounded surface facing the condenser lens.

19. The overhead projector in accordance with claim 3 wherein said support arm has a rounded surface at its bottom at which the support arm is secured to the housing for guiding an edge of a jacket supporting said object when the lower and upper plates are rotated with said sheet being interposed therebetween, said rounded surface facing the condenser lens.

20. The overhead projector in accordance with claim 4 wherein said support arm has a rounded surface at its bottom at which the support arm is secured to the housing for guiding an edge of a jacket supporting said object when the lower and upper plates are rotated with said sheet being interposed therebetween, said rounded surface facing the condenser lens.

* * * * *